United States Patent
Jones et al.

(10) Patent No.: US 11,328,083 B2
(45) Date of Patent: *May 10, 2022

(54) FACILITATING ENTITY RESOLUTION VIA SECURE ENTITY RESOLUTION DATABASE

(71) Applicant: EQUIFAX INC., Atlanta, GA (US)

(72) Inventors: Gregory Dean Jones, Alpharetta, GA (US); Marek Ludomir Cyzio, Melbourne, FL (US); Amy Michelle Worrell, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/879,609

(22) Filed: May 20, 2020

(65) Prior Publication Data

US 2020/0279053 A1    Sep. 3, 2020

Related U.S. Application Data

(63) Continuation of application No. 16/615,744, filed as application No. PCT/US2019/017614 on Feb. 12, 2019, now Pat. No. 10,691,825.

(Continued)

(51) Int. Cl.
*G06F 21/62* (2013.01)
*G06F 16/23* (2019.01)
*G06F 16/25* (2019.01)

(52) U.S. Cl.
CPC ...... *G06F 21/6227* (2013.01); *G06F 16/2379* (2019.01); *G06F 16/252* (2019.01); *G06F 21/6245* (2013.01)

(58) Field of Classification Search
CPC ..... G06F 16/2379–2386; G06F 16/252; G06F 16/951; G06F 21/60; G06F 21/62;

(Continued)

(56) References Cited

U.S. PATENT DOCUMENTS 9,158,925 B2    10/2015  Kamara
9,503,432 B2    11/2016  El Emam et al.
(Continued)

FOREIGN PATENT DOCUMENTS

WO    2016201511 A1    12/2016

OTHER PUBLICATIONS

European Patent Application No. 19751147.0, "Extended European Search Report", dated Oct. 12, 2021, 7 pages.

(Continued)

*Primary Examiner* — Kevin Bechtel

(74) *Attorney, Agent, or Firm* — Kilpatrick Townsend & Stockton LLP

(57) ABSTRACT

In some aspects, an entity-resolution computing system for entity resolution is provided. The entity-resolution computing system includes an entity resolution computing device configured as an interface between a client computing device and an encrypted identity data repository that contain resolved entity dataset. The entity resolution computing device is configured for servicing a resolution request from the client computing device by matching encrypted indexes generated from identity data objects stored in a client identity database to encrypted data objects stored in the encrypted identity data repository. The resolution computing device retrieves and transmits a common entity identifier associated with the encrypted data objects so that the client computing device can link the identity data objects stored in a client identity database via the common entity identifier.

20 Claims, 6 Drawing Sheets

Related U.S. Application Data

(60) Provisional application No. 62/629,376, filed on Feb. 12, 2018.

(58) Field of Classification Search
CPC .......... G06F 21/6218–6281; G06F 2221/2107; G06F 2221/2117; H04L 63/0428–0485; H04L 2209/04–046
See application file for complete search history.

(56) References Cited

U.S. PATENT DOCUMENTS

| | | | |
|---|---|---|---|
| 10,600,506 B2* | 3/2020 | Blum | G16H 10/60 |
| 2006/0041533 A1 | 2/2006 | Koyfman | |
| 2009/0106242 A1 | 4/2009 | McGrew et al. | |
| 2012/0233129 A1 | 9/2012 | Brinkmoeller et al. | |
| 2013/0066851 A1 | 3/2013 | Allen et al. | |
| 2017/0099263 A1* | 4/2017 | Matsuzaki | H04L 63/0442 |
| 2019/0213356 A1* | 7/2019 | Vagujhelyi | G06F 21/6254 |
| 2019/0236310 A1* | 8/2019 | Austin | G06F 21/6254 |

OTHER PUBLICATIONS

"Connexus 2.0", Equifax Inc., Consumer Information Solutions, EFS-728-ADV, Available Online at: https://www.equifax.com/pdfs/corp/EFS-728-ADV-Connexus-2_0-Prod-Sheet.pdf, May 2008, 2 pages.

"Consumer Credit Reports from Equifax: Relevant Consumer Data for Faster, More Informed Decisions", Equifax Inc., EFS-002-ADV, Available Online at: https://www.equifax.com/ePort/pdfs/ConsumerCreditProducts.pdf, Feb. 2007, 4 pages.

"National Consumer Telecom & Utilities Exchange", Equifax Inc., Available Online at: https://assets.equifax.com/assets/usis/nctue_plus_ps.pdf, 2016, 2 pages.

"The Work Number Direct for Employers", Workforce Solutions, Available Online at: https://www.equifax.com/assets/WFS/direct-for-employers.pdf, 2016, 1 page.

U.S. Appl. No. 16/615,744, "Notice of Allowance", dated Feb. 11, 2020, 11 pages.

PCT/US2019/017614, "International Search Report and Written Opinion", dated Jun. 12, 2019, 10 pages.

* cited by examiner

FACILITATING ENTITY RESOLUTION VIA SECURE ENTITY RESOLUTION DATABASE

CROSS REFERENCE TO RELATED APPLICATIONS

This application is a continuation of U.S. patent application Ser. No. 16/615,744, filed Nov. 21, 2019, which is a 371 National Stage Entry of PCT/US2019/017614, filed Feb. 12, 2019, which claims priority to U.S. Provisional Application No. 62/629,376, filed on Feb. 12, 2018, all of which is hereby incorporated herein by reference for all purposes.

TECHNICAL FIELD

This disclosure relates generally to computers and digital data processing systems for facilitating entity resolution with database records while ensuring cybersecurity.

BACKGROUND

Electronic transactions involve exchanges of data among different, remotely located parties via one or more online services. Such entities may possess valuable databases that contain transactions and information relating to such products and services. But databases may be incomplete or inaccurate. For example, a database object may list "Gregory Jones" in a name field, but the individual to whom the object refers may also use another name such as "Greg Jones," resulting in an incomplete object.

For example, a first entity may have a valuable database with entries generated from transactions related to products and services. A second entity may have a second database from a separate set of transactions or a second source, but the objects in the second database may be fragmented and therefore not useful. Fragmentation may include a data object within the second database not having a complete set of fields or not referring to variants such as alternative names and addresses. Accordingly, the second entity may wish to validate or augment its database with that of the first entity to increase the robustness of the data.

But sharing the second database with the first entity in order for the first entity to validate or augment the database may not be an option because the second database contains personally identifiable information and is viewed as a business asset. The first entity may not wish to share the first database with the second entity for the same reasons. Moreover, transmitting database entries over a network connection can also be problematic due to the databases including personally identifiable information that may be intercepted or received by unintended recipients.

SUMMARY

Various embodiments of the present disclosure provide entity resolution by correlating data objects from different database structures. In one example, an entity-resolution computing system includes a client computing device, an entity resolution computing device, a client identity database. The client computing device can be communicatively coupled to the client identity database. The client identity database can store identity data objects having identity information. The entity resolution computing device can be an interface between the client computing device and an encrypted identity data repository. The encrypted identity data repository can store a resolved entity dataset that includes encrypted data objects with encrypted versions of the identity information from the client identity database, as well as an encrypted data object with an encrypted version of additional identity information that is absent from the client identity database. The encrypted identity data repository, which is accessible to the entity resolution computing device, can store a common entity identifier linking the encrypted data objects.

Continuing with this example, the client computing device can generate encrypted indexes from the identity data objects. The client computing device can transmit, to the entity resolution computing device, a resolution request including the encrypted indexes. The entity resolution computing device can service the resolution request by matching the encrypted index from the request to the encrypted versions of the identity information. The entity resolution computing device can retrieve the common entity identifier and transmit the common entity identifier to the client computing device. The entity resolution computing device can also prevent the client computing device from accessing the additional identity information that is absent from the client identity database. The client computing device can update the client identity database by linking identity data objects via the common entity identifier. This linking operation can disambiguate the first identity data object and the second identity data object.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
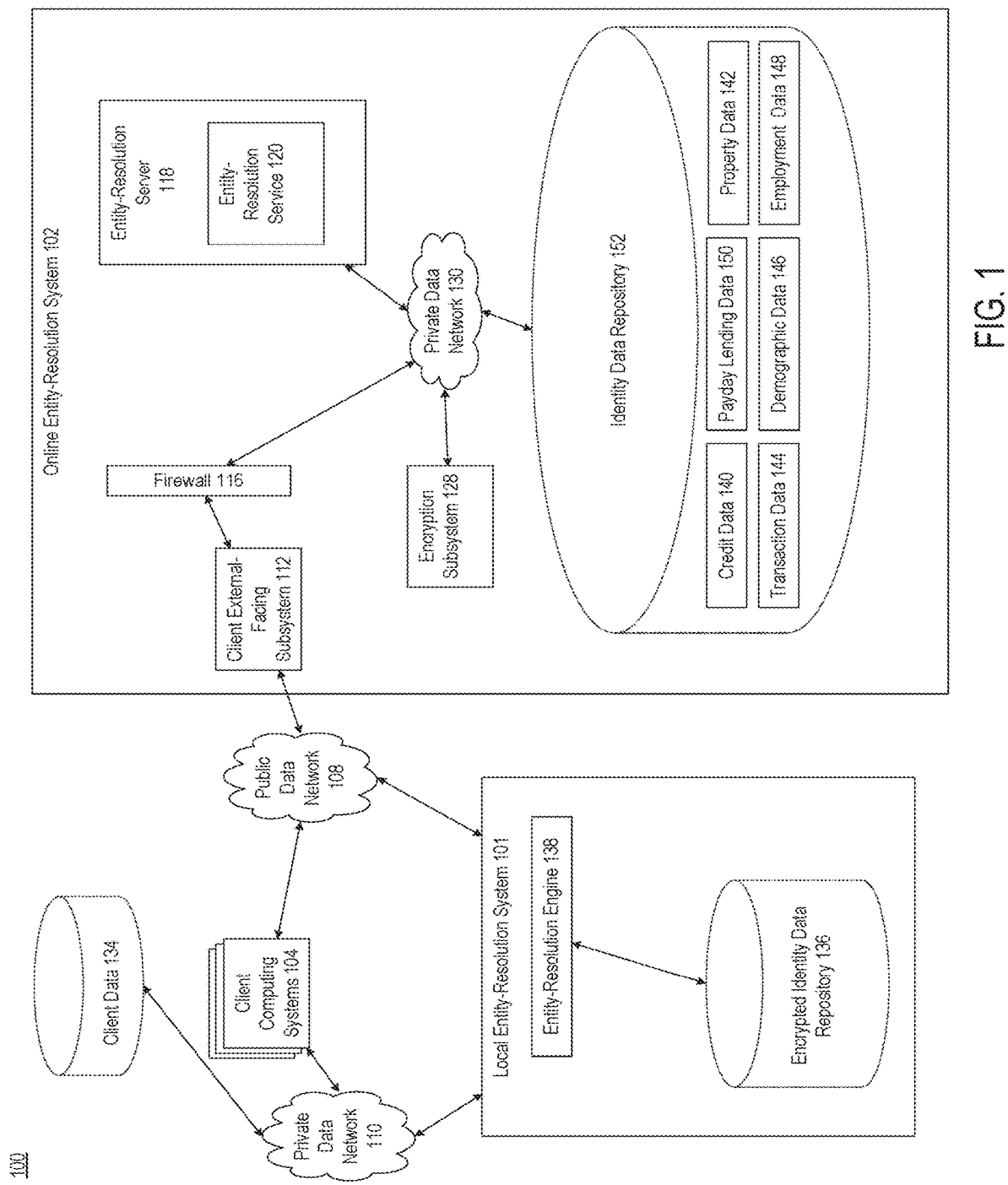
FIG. 1 is a block diagram depicting an example of an operating environment in which an entity-resolution system can be used to defragment entity data objects by comparing information related to entity data objects with information in the encrypted identity data repository according to certain aspects of the present disclosure.

Certain aspects and features of the present disclosure involve entity resolution by resolving database structures by correlating data objects. Entity resolution refers to the process of disambiguating records that correspond to the same entity. Disambiguation can be accomplished, for example by linking or grouping records that refer to a common identity. In particular, certain aspects of the present disclosure increase the robustness of a database by updating data structures with variant data objects that are associated with the same entity.

The use of computing devices to store and manage databases has become increasingly important for business. For example, businesses develop and use valuable databases that contain transactions and information relating to users of the business's products and services. But a database may not represent a complete picture of an individual or entity, therefore augmentation with data from another database can be desirable. But augmenting millions of records can be time consuming, exasperated by slow network connections across public networks such as the Internet. Additionally, due to cybersecurity and privacy concerns, owners of such databases may be hesitant to share database records with other entities to facilitate augmentation, for fear that personal information can be exposed in transit, that the other entity will copy the entire database, or the database could fall into the wrong hands.

One solution to this problem is to encrypt an entire database before transmission to another entity. This solves the problem of personally identifiable information being exposed in transit. But this solution still permits the wholesale copying of the database by the receiving entity and fails to solve the problem of easily merging large quantities of information over slow network connections.

Certain aspects described herein can overcome the limitations of previous solutions by deploying both an engine and an associated identity data repository to a client computing system operated by a receiving entity. The engine can be deployed at the client computing system, which can include multiple computing devices in a secure, private network. The engine can be used to defragment entity data objects stored at the client computing system by comparing information in the entity data objects to information from the encrypted identity data repository.

Several measures can be provided for security, such as encryption and limiting access to the identity repository. For example, the identity data repository can be encrypted such that the client computing system cannot directly access sensitive data in the identity data repository. Additionally, access can be limited by the engine. For example, the engine can process a request for an entity identifier from a data object that is associated with a specific index in the identity data repository. The engine can thereby help match an entity data object in the identity data repository with the fragmented data objects from the request. Based on the match, the engine can securely provide a common entity identifier, for the data objects to the receiving entity across the secure, private network, where the provided entity identifier can be used by the client computing system to link the fragmented data objects together.

Using the received entity identifier, the client computing system may augment an existing database by combining objects that have the same entity identifier, thereby improving accuracy and completeness. But the client computing system can only access the entity identifiers for records for which the receiving system has an index, i.e., a matching record. Requiring the engine for interactions with the repository can prevent other, non-matching entity data objects from being exposed to the requesting entity, even within the private network of the client computing system. Security measures can include detecting attempts to circumvent the engine or consistent attempts to match data that does not refer to the same entity.

Also, because hashed and encrypted data cannot easily be read in transit, personally identifiable information remains protected. In this manner, the engine can allow the identity data repository to be used for defragmenting data in the client computing system, without allowing unauthorized access by the client computing system to other entity data from the identity data repository.

Further, the deployment of an entity-resolution engine within a client computing system (e.g., at a facility of the receiving entity) provides additional technical advantages, such as reduced latency and throughput. For example, due to physical proximity, a time from receiving a request by receiving entity to first data structure being received by the receiving entity may be lower than if the request were to travel across the Internet. Additionally, the receiving system may enjoy increased throughput to and from the entity-resolution engine, because the private data network is a dedicated internal network of the client computing system. Additionally, a client computing system can benefit from increased performance. For example, the entity-resolution engine may be dedicated to a client computing system and configured to not address requests from other computing systems.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Entity Resolution Computing Service

FIG. 1 is a block diagram depicting an example of an operating environment in which an entity-resolution system can be used to defragment entity data objects by comparing information related to entity data objects with information in the encrypted identity data repository. FIG. 1 depicts entity-resolution computing environment 100 which includes examples of hardware components such as a local entity-resolution system 101 and an online entity-resolution system 102. Local entity-resolution system 101 and the online entity-resolution system 102 are specialized computing systems that may be used for processing large amounts of data using a large number of computer processing cycles. Local entity-resolution system 101 and online entity-resolution system 102 are connected to one or more client computing systems 104.

The number of devices depicted in FIG. 1 is provided for illustrative purposes. Different numbers of devices may be used. For example, while certain devices or systems are shown as single devices in FIG. 1, multiple devices may instead be used to implement these devices or systems.

Online entity-resolution system 102 can provide entity-resolution functionality to client computing systems 104. For example, the online entity-resolution system 102 can generate, update, or otherwise provide the local entity-resolution system 101 that provides local entity-resolution functionality to client computing systems 104. In one example, the local entity-resolution system 101 can provide defragmentation functionality for a client computing system 104. Defragmentation refers to the process of determining that two data objects refer to the same entity and grouping or linking the data objects together, thereby reducing the number of fragmented data objects. Online entity-resolution system 102 can be configured as a cloud-based system and can connect to one or more client computing systems 104 via public data network 108.

Online entity-resolution system 102 can include one or more entity-resolution servers 118 that operate an entity-resolution service 120, an identity data repository 152, an encryption subsystem 128, a firewall 116, a client external-facing subsystem 112, and a private data network 130. Online entity-resolution system 102 can be physically located separately from client devices such as client computing system 104 and interact with client computing system 104 via one or more private or public data networks.

The entity-resolution server 118 may be a specialized computer or other machine that processes the data received within the online entity-resolution system 102. The entity-resolution server 118 may include one or more other systems. For example, the entity-resolution server 118 may include a database system for accessing the network-attached storage unit, a communications grid, or both. A communications grid may be a grid-based computing system for processing large amounts of data.

The entity-resolution server 118 can include one or more processing devices that execute program code, such as entity-resolution service 120 or encryption subsystem 128. The program code can be stored on a non-transitory computer-readable medium. The entity-resolution service 120 can execute one or more processes for resolving different entities.

The entity-resolution server 118 may interact, via one or more private data networks 130, with various external-facing subsystems of the entity-resolution server 118. For instance, an individual can use a client computing system 104 to access the client external-facing subsystem 112. The client external-facing subsystem 112 can prevent a client computing system 104 from accessing databases such as the identity data repository 152.

Identity data repository 152 can contain different kinds of data such as data from purchases of products or services, sales data, credit data such as loan applications or credit card transactions. For example, the identity data repository 152 can include credit data 140, property data 142, transaction data 144, demographic data 146, employment data 148, or payday lending data 150.

Identity data repository 152 can include internal databases or other data sources that are stored at or otherwise accessible via the private data network 130. The various data stored in the identity data repository 152 can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

Entity-resolution server 118 can create one or more common identifiers for entity information received from different computing systems. Entity-resolution server 118 can populate identity data repository 152 with data objects from one or more databases that can be derived from different sources. For example, entity-resolution server 118 can combine online transaction data 144 with credit data 140.

In so doing, entity-resolution server 118 can perform defragmentation or augmentation of data objects from different databases, by resolving data objects that point to the same entity and placing the data objects in identity data repository 152. Entity-resolution server 118 can create a common identifier for each separate entity and provide the common identifier to the data objects that point to the entity. In an aspect, the common identifier may have significance beyond the identity data repository 152, for example in other databases.

Different algorithms and methods can be used to generate identity data, including "fuzzy matching" or machine learning techniques. Fuzzy matching can find correspondences between records that contain text and numerical values that do not match perfectly and therefore would not match under a stricter method.

For example, entity-resolution server 118 can determine that two data objects refer to the same entity because the address varies by only one word, e.g. "Street" versus "Drive." Other algorithms are possible. Fuzzy matching also allows for matching two records that include a numerical value such as a social insurance or driver's license number that differs by one digit, by otherwise validating the match.

Entity-resolution server 118 can populate identity data repository 152 with variant data objects. Variant data objects can include commonly used nicknames of a particular name, or equivalencies derived from transactions with user devices. Variant data objects can be based on historical search terms such as synonyms, misspellings, or variants of names in other languages. For example, variants of "Gregory" may include "Gregirius," "Gregori," or "Grzegorz." Variant data objects include objects identified through user device interactions as referring to the same entity. For example, the entity-resolution server may determine that a previous search from a user device for "Gregory Jones" included in a result "Gregory Dean Jones" that was accepted by the user device. The entity-resolution server may create a variant data object with the entry "Gregory Dean Jones" and link the variant data object with the object "Greg Jones."

Variant data objects can also include well-known variations in identifiers such as common short names or nicknames. For example, the entity-resolution server may create a variant data object with the entry "Greg Jones" based on "Greg" being a common nickname for "Gregory," and may link the variant data object with the object "Gregory Jones."

The identity data repository 152 can include one or more files such as database files that can be replaced or updated by the owner of the online entity-resolution system 102 without involvement from other parties. For example, the owner may provide an update to identity data repository 152 that includes updated data such as new property data 142 or new demographic data 146.

Encryption subsystem 128 can provide a variety of encryption and hashing techniques. For example, encryption subsystem 128 can encrypt and decrypt data from identity data repository 152 such that the data is not read in transit over the public data network 108 to the client computing system 104. For example, encryption subsystem 128 may encrypt or decrypt part or all of identity data repository 152. In the event that an unauthorized access attempt or suspicious request or activity is detected, encryption subsystem 128 may delete a decryption key for the encrypted identity data repository 152, thereby preventing further access to the encrypted identity data repository 152. Encryption subsystem 128 can also encrypt identity data repository 152 upon shutdown of the entity-resolution server 118 and request a decryption key upon startup of the entity-resolution server 118.

Each external-facing subsystem can include one or more computing devices that provide a physical or logical sub-network (sometimes referred to as a "demilitarized zone" or a "perimeter network") that expose certain online functions of online entity-resolution system 102 to an untrusted network, such as the Internet or another private data network.

The client external-facing subsystem 112 can be communicatively coupled, via a firewall 116, to one or more computing devices forming a private data network 130. The firewall 116, which can include one or more devices, can create a secured part of online entity-resolution system 102 that includes various devices in communication via the private data network 130. In some aspects, by using the private data network 130, the online entity-resolution system 102 can house the identity data repository 152 in an isolated network (i.e., the private data network 130) that has no direct accessibility via the Internet, another public data network, or another private data network. In an aspect, the components of the online entity-resolution system 102, such as the entity-resolution server 118 and the identity data repository 152, execute on one computing device. In this aspect, private data network 130 may be an internal bus or other connection internal to the online entity-resolution system 102.

Online entity-resolution system 102 can be connected to public data network 108. Through public data network 108, online entity-resolution system 102 can access local entity-resolution system 101 and client computing systems 104.

In some aspects, local entity-resolution system 101 may be located physically close to client computing systems 104 (e.g., within the same facility, same local area network, etc.). Co-locating the local entity-resolution system 101 and a client computing system 104 can provide high performance, low latency, or both with respect to entity resolution. Online entity-resolution system 102 can be located remotely from client computing system 104, for example, over a secure virtual private network (VPN).

Client computing systems 104 can use local entity-resolution system 101 to defragment entity data objects. Client computing system 104 may include one or more third-party devices, such as individual servers or groups of servers operating in a distributed manner. Client computing system 104 can include any computing device or group of computing devices operated by a seller, lender, or other provider of products or services. Client computing system 104 can include one or more server devices. The one or more server devices can include or can otherwise access one or more non-transitory computer-readable media.

Client computing system 104 can be connected to private data network 110 or public data network 108. Client data 134, which can store entity data objects to be defragmented, can be connected to client computing system 104 via private data network 110. Client computing system 104 can connect to local entity-resolution system 101 via private data network 110 and public data network 108. Client computing system 104 can connect to online entity-resolution system 102 via public data network 108.

A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to entity-resolution computing environment 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

Local entity-resolution system 101 can perform entity resolution functionality to facilitate defragmentation of entity data objects. Local entity-resolution system 101 can operate an entity-resolution engine 138 and can include encrypted identity data repository 136.

In an example, client computing system 104 can use local entity-resolution system 101 to defragment entity data objects stored in client data 134. Entity-resolution engine 138 can provide one or more entity identifiers upon request from client computing system 104. Client computing system 104 can create a first encrypted index for a first data object and a second encrypted index for a second data object. For example, an index could be a hashed email address, or a hashed social insurance number. Client computing system 104 need not provide personally identifiable information (PII) in the clear to local entity resolution system 101.

Client computing system 104 can transmit the first encrypted index and the second encrypted index to local entity-resolution system 101. Entity-resolution engine 138 can select a first common entity identifier corresponding to the first encrypted index and a second common entity identifier corresponding to the second encrypted index. Entity-resolution engine 138 can determine, from a comparison of the first common entity identifier and the second common entity identifier, whether the first data object and the second data object should be resolved to the same entity.

For example, if the first common entity identifier is equal to the second common entity identifier, then the entity-resolution engine 138 can notify the client computing system 104 that the first data object and the second data object refer to a common identity. Based on this notification, the client computing system 104 can update the client data 134. This update can include, for example, augmenting the first data object with data from the second object, linking the first and second data objects together via the common entity identifier, or both. This update can defragment the client data 134, thereby allowing a search for the common entity to retrieve the data from both the first data object and the second data object.

Entity-resolution engine 138 can include program code executable by one or more processing devices. The program code can be stored on a non-transitory computer-readable medium. The entity-resolution engine 138 can perform one or more processes for resolving different entity data objects from the client data 134 to a common entity.

Encrypted identity data repository 136 can contain a resolved entity dataset which includes different kinds of data, such as data from purchases of products or services, sales data, credit data such as loan applications or credit card transactions. Encrypted identity data repository 136 can be an encrypted version of identity data repository 152. For example, identity data repository 136 can contain the same data objects as identity data repository 152, but in encrypted form for added security, for example, as entity-resolution engine 138 can be located at the premises of a client. Encrypted identity data repository 136 can include internal databases or other data sources that are accessible to the entity-resolution engine 138.

In some aspects, encrypted identity data repository 136 can include consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social insurance number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The encrypted identity data repository 136 can employ one or more data structures, such as a database, storing records or other data objects that can be replaced or updated using entity-resolution engine 138. For example, entity-resolution engine 138 may communicate with the online entity-resolution system 102 to update encrypted identity data repository 136 with new or updated data from the identity data repository 152.

The local entity-resolution system 101 can facilitate a similar level of reliability with respect to entity resolution that would be available from the online entity-resolution system 102 while maintaining the security of sensitive data in the identity data repository 152. For example, using an encrypted identity data repository 136 can lower the risk that an unauthorized third party can access sensitive information via the client computing system 104 other than the sensitive information already stored in the client data 134. Additionally, because the local entity-resolution system 101 is limited to returning a common entity identifier (or other entity resolution notification) and thereby avoids returning a data object, the client computing system 104 is unable to query for an entire data object and therefore access the proprietary data from the encrypted identity data repository 136.

In an aspect, the encrypted identity data repository 136 can be licensed. A license period can last for a period of time such as one day. After a time period has passed, entity-resolution engine 138 can cease accessing the identity data repository and request a new license file, e.g., from a master server. Upon receiving a new license file, entity-resolution engine 138 may resume providing access to encrypted identity data repository 136. Similarly, the identity data repository 152 can be licensed. After a time period has passed, entity-resolution server 118 can cease accessing the identity data repository and request a new license file. Upon receiving a new license file, entity-resolution server 118 may resume providing access to identity data repository 152.

In another aspect, an entity-resolution device such as local entity-resolution system 101 or online entity-resolution system 102 can detect unauthorized access, tampering, or abuse. As disclosed herein, entity-resolution devices can return entity identifiers rather than database objects, thereby preventing duplication of data in the encrypted identity data repository 136 or the identity data repository 152.

Entity-resolution server 118 can implement tamper protection. For example, entity-resolution server 118 can remotely monitor the requests from client computing system 104 and can maintain a log of the indexes provided by client computing system 104. Entity-resolution server 118 can analyze the indexes to determine whether the indexes are an attempt to reverse engineer or extract data from identity data repository 152.

Tamper protection can also be implemented by a threshold function. For example, a threshold number of requests that include indexes for objects which are unlikely correlated or when a threshold of requests that result in different, i.e., non-matching, entity identifiers being returned can be suspicious. In the event that a computing device such as client computing system 104 submits a pattern of requests for entity identifiers that is indicative of unauthorized use, the entity-resolution device can take an action such as ceasing to function, removing access from the client computing device, or notifying the owner.

Online entity-resolution system 102 may also include one or more network-attached storage units on which various repositories, databases, or other data structures are stored. Examples of these data structures are the identity data repository 152 and encrypted identity data repository 136. Network-attached storage units may store a variety of different types of data organized in a variety of different ways and from a variety of different sources. For example, the network-attached storage unit may include storage other than the primary storage located within entity-resolution server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

In some aspects, the entity-resolution computing environment 100 can implement one or more procedures to secure communications between the entity-resolution computing environment 100 and other client systems. Non-limiting examples of features provided to protect data and transmissions between the online entity-resolution system 102 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

Examples of Entity Resolution Operations

Entity-resolution computing environment 100 can execute one or more processes to perform entity resolution, specifically correlating objects that refer to the same entity into a data structure and providing the data structure to client computing systems 104.

Figure 2:
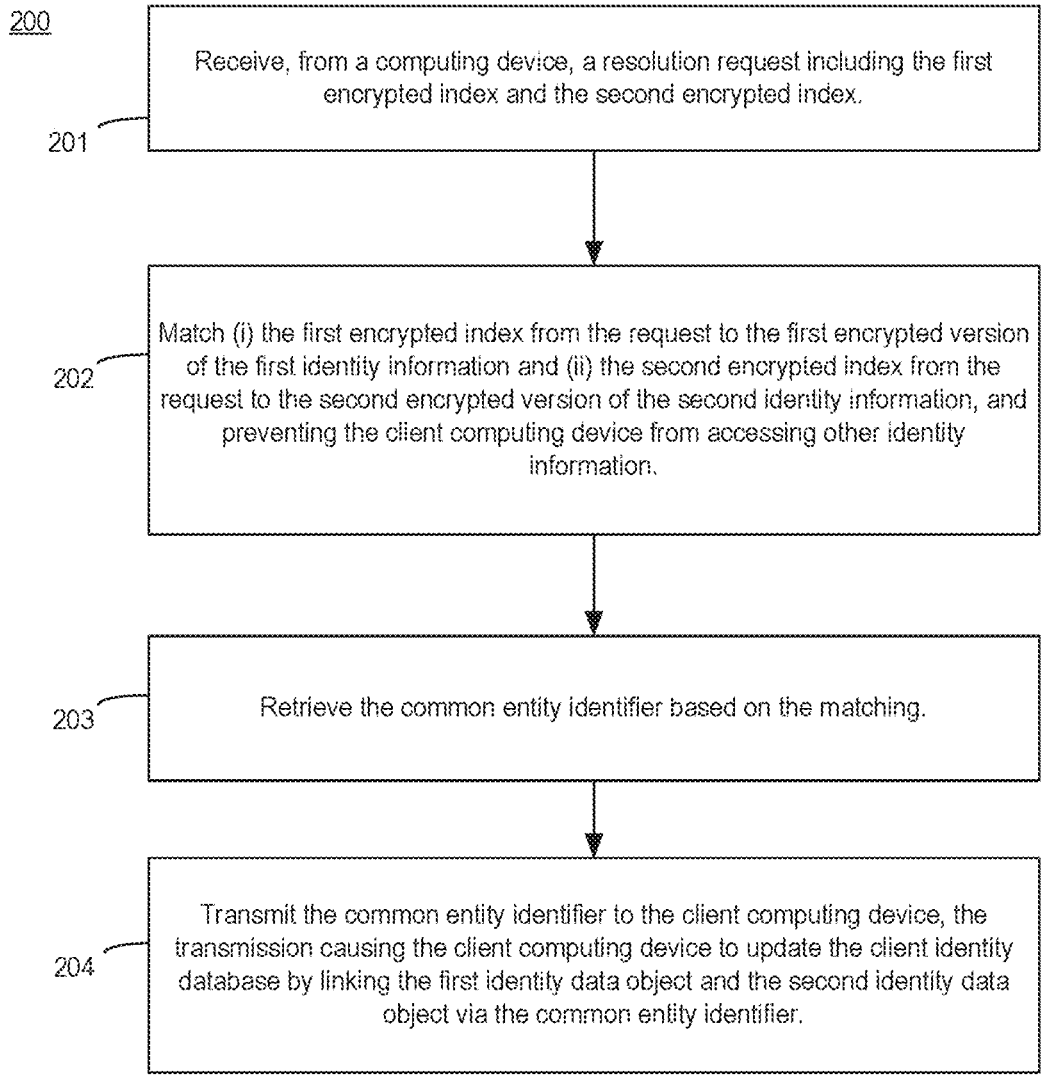
FIG. 2 is a flow chart illustrating an example of a process for using an entity-resolution device for defragmenting entity data objects according to certain aspects of the present disclosure.

FIG. 2 is a flow chart illustrating an example of a process 200 for using an entity-resolution device for defragmenting entity data objects. For illustrative purposes, the process 200 is described with reference to implementations described above with respect to one or more examples described herein. Other implementations, however, are possible. For example, process 200 may be used to obtain an entity identifier for one data object or separate entity identifiers for each of multiple data objects.

In some aspects, the steps in FIG. 2 may be implemented in program code that is executed by one or more computing devices such as the entity-resolution server 118 or entity-resolution engine 138 depicted in FIG. 1. In some aspects of the present disclosure, one or more operations shown in FIG. 2 may be omitted or performed in a different order. Similarly, additional operations not shown in FIG. 2 may be performed.

At block 201, the process 200 involves receiving a resolution request that includes the first encrypted index and the second encrypted index. For example, client computing system 104 requests an entity-resolution device such as entity-resolution server 118 to defragment data contained in client data 134. A first data object and a second data object in client data 134 could not be definitively identified as referring to the same entity, but may refer to the same entity. The data objects may differ in some form, e.g., one data object may refer to a name "Bob Jones," whereas another data object may refer to a name "Rob Jones." To address this issue, the client computing system 104 can create a first encrypted index for a first data object, e.g., the object that contains "Bob Jones," and a second encrypted index for a second data object, e.g., the object that contains "Rob Jones,"

At block 202, the process 200 involves matching (i) the first encrypted index from the request to the first encrypted version of the first identity information and (ii) the second encrypted index from the request to the second encrypted version of the second identity information.

For example, the entity-resolution engine 138 receives the first encrypted index, e.g., the object that contains "Bob Jones," and the second encrypted index, e.g., the object that contains "Rob Jones," from the client computing system 104. The entity-resolution engine 138 searches in the encrypted identity data repository 136 for a first encrypted version of the identity information that matches the first encrypted index and a second encrypted version of the identity information that matches the second encrypted index. The entity-resolution engine 138 therefore obtains a first encrypted version of identity information that refers to "Bob Jones" and a second encrypted version of identity information that refers to "Rob Jones."

The entity-resolution engine 138 determines a first entity identifier from the first encrypted version of identity information and a second entity identifier from the second encrypted version of identity information. The entity-resolution engine 138 matches the first entity identifier with the second entity identifier.

In an aspect, client computing system 104 can submit a rule for configurable match. More specifically, client computing system 104 can submit a rule to the entity-resolution engine 138 that defines the relative importance of different data within the data objects. For example, a client computing system 104 may emphasize the importance of having an exact match with the address field or an exact match of a social insurance number of the data objects. The entity-resolution engine 138 can receive the rule and act accordingly, for example, when determining whether the first encrypted version of the identity information and the second encrypted version of the identity information match. In this example, the entity-resolution engine 138 limit the provision of a common entity key to cases where the address field completely matches between the first encrypted index and the second encrypted index.

The entity-resolution engine 138 can implement block 202 while preventing the client computing device from accessing other identity information in the encrypted identity data repository 136. Entity-resolution engine 138 does not permit client computing system 104 to access encrypted identity data repository 136. Additionally, because entity-resolution engine 138 is limited to returning a common entity identifier (or other entity resolution notification), client computing system 104 is unable to query for an entire data object.

At block 203, the process 200 involves retrieving the common entity identifier based on the matching. The first encrypted version of the identity information and the second encrypted version of the identity information each have a respective entity identifier. The entity-resolution engine 138 retrieves a first entity identifier matching the first encrypted version of the identity information and a second entity identifier matching the second encrypted version of the identity information from encrypted identity data repository 136.

An entity identifier is unique to a determined entity, but is not necessarily unique for a given data object, because multiple data objects can refer to the same entity. Therefore, given an index for a given data object, the entity-resolution device returns the corresponding entity identifier. Based on the respective entity identifiers, entity-resolution engine 138 may determine that the two data objects, in fact, refer to the same entity. Continuing the example, entity-resolution engine 138 determines that "Rob Jones" and "Bob Jones" refer to a common entity.

As discussed, in an aspect, the entity resolution engine may consider a rule provided by client computing system 104. Such a rule may emphasize the importance of a match of a certain field, e.g., address.

At block 204, the process 200 involves transmitting the common entity identifier to the client computing device. The transmission causes the client computing device to update the client identity database by linking the first identity data object and the second identity data object via the common entity identifier.

Continuing the example of "Bob Jones" and "Rob Jones," entity-resolution engine 138 returns one common entity identifier. The client computing system 104 now determines that the two objects refer to the same entity. For example, "Bob" may be a nickname that "Rob Jones" uses. This process can continue. For example, the client computing device may have another data object that has the name "Robert Glenn Jones," and may submit another request to the entity-resolution device.

The client computing system 104 can combine or link the first data object and the second data objects, thereby forming a more complete picture of the common entity. Therefore, continuing the example, client computing system 104 combines or links the data objects "Rob Jones" and "Bob Jones." In this example, client computing system 104 has completed this process without obtaining any complete data objects (e.g., PII or other sensitive data) from encrypted identity data repository 136.

In the case that the first encrypted index and the second encrypted index do not refer to the same entity, the entity-resolution device returns the identifiers for the first and second data objects. Such identifiers are unique to the entity to which the objects refer and can be later used to disambiguate data objects.

For illustrative purposes, the process 200 is described using a simplified example of a matching process. But other implementations are possible. For example, the client computing system 104 can provide a set of multiple hashed indexes or hashed values to the local entity-resolution system 101. For example, multiple hashed values generated based on the first data object can be included in or attached to the first encrypted index provided by the client computing device. The entity-resolution engine 138 can use a subset of these hashed values to select candidate data objects for further similarity analysis. The similarity analysis can determine similarities between one or more candidate data objects stored in the encrypted identity data repository 136 and the entity data represented by the hashed values provided by the client computing system 104. The entity-resolution engine 138 can use the set of hashed values to evaluate the closeness of the candidate data objects to client data corresponding to the hashed values. The entity-resolution engine 138 can provide, to client computing system 104, scores or other indicators of matching closeness for the candidate data objects along with entity identifiers for the scored objects.

In this example, at block 201, the entity-resolution engine 138 can receive multiple hashed values from the client computing system 104. The entity-resolution engine 138 can use at least some of these hashed values to identify a subset of the data objects, e.g., candidate data objects for further analysis. For example, if the entity-resolution engine 138 receives 100 hashed values from a client computing system 104, entity-resolution engine 138 may use 20 of the hashed values to search for matching data objects within an identity repository. Hash values can be generated based on requirements of the entity-resolution engine 138 or availability of data in client data 134.

As a simplified example, a hash value of the first two letters of the first name, the first two letters of the last name, and the zip code can be used to find potential candidate data objects. Alternatively, other hash values can be generated and used. Candidate data objects may or may not be selected later in the process and the entity identifiers for the candidate data objects may not be returned, for example, if the candidate data object does not match the object represented by the hash values.

Continuing the example, the matching and retrieval operations of blocks 202 and 203 can involve a similarity analysis of the candidate objects. In some aspects, the analysis can include evaluating one or more decision rules that are configurable by an operator of the client computing system 104. More specifically, the entity-resolution engine 138 can use a second set of hashed values (e.g., a larger set of hashed values or the entire hash values received at block 201) in order to determine how closely data from objects in the encrypted identity data repository 136 matches the set of indexes provided by the client computing system 104.

For example, the entity-resolution engine 138 can create a similarity vector based on the hash values provided by the client computing system 104. The similarity vector can be used to evaluate the similarity of one or more of the candidate data objects with respect to the provided hash values. An example of a similarity vector could include a hash of full first name and full last name matches, a hash of complete address matches, a hash of street name, city, state and last name matches, a hash of a "Metaphone3" record, hash records that have a common phone number and common first three characters of a last name. In a matching process, the similarity vector for a provided set of hashed indexes can be compared to a corresponding vector generated from data in the encrypted identity data repository 136.

In this example, the local entity-resolution system 101 can determine which candidate objects (or sets of candidate objects) have a sufficiently close match to the similarity vector. In various aspects, the closeness of a match can be indicated using a numerical score (e.g., degrees of closeness, the percentage of matching data, the distance between vectors), a descriptive indicator (e.g., "high confidence," "medium confidence, etc.). The candidate data objects need not match perfectly and can be selected based on user-provided criteria with respect to the closeness of the match. In this example, block 204 of the process 200 can involve the local entity resolution system 101 providing, to the client computing system 104, both corresponding entity identifiers and indicators of closeness (i.e., the score or descriptive indicator) generated by the similarity analysis for certain candidate objects (or sets of candidate objects) having a sufficiently close match (e.g., 90% similarity, high-confidence match).

Various operations performed by the local entity-resolution system 101 can be controlled by user-configurable rules provided by the client computing system 104. The user-configurable rules can be tailored to the operations performed by the client computing system 104. For instance, in some aspects, the sufficiency of a match can be determined based on user-configurable rules provided to the local entity-resolution system 101 by the client computing system 104. For example, a rule could be to return the entity identifiers for the data objects for which a hash of a first name and last name matches. A rule can also be based on a threshold, or percentage of match. Additionally, a rule may be based on a confidence score or description, e.g., "high confidence," or "medium confidence," etc. In additional or alternative aspects, the number of evaluated candidates returned by the matching process can be controlled by user-configurable rules provided to the local entity-resolution system 101 by the client computing system 104. For example, a rule could be to return the highest scored candidate, the top several highest candidates, etc.

Figure 3:
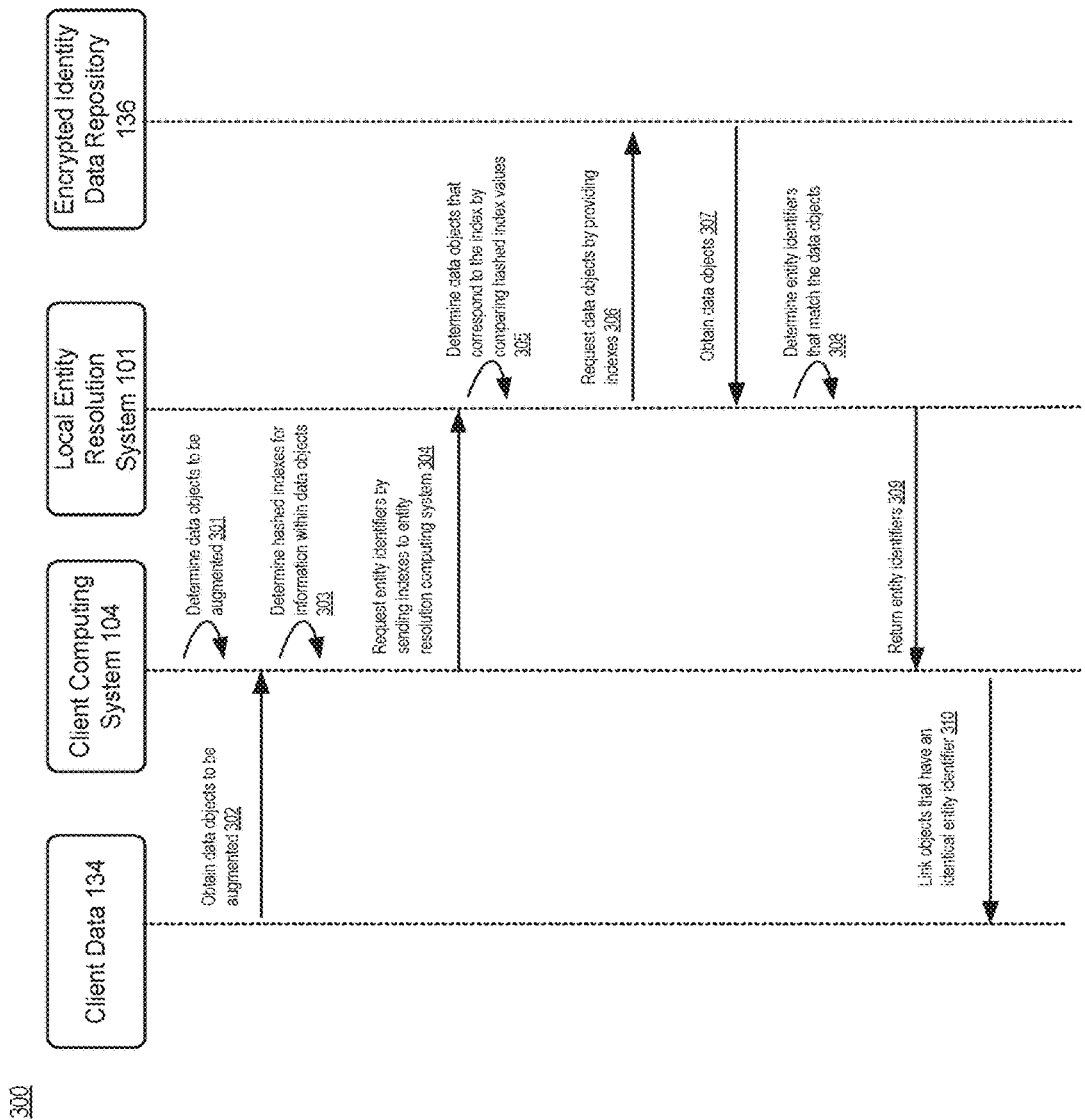
FIG. 3 is flow diagram depicting the use of an entity-resolution device for defragmenting entity data objects according to certain aspects of the present disclosure.

FIG. 3 is a flow diagram depicting the use of an entity-resolution device for defragmenting entity data objects. FIG. 3 depicts communication flow between client data 134, client computing system 104, local entity-resolution system 101, and encrypted identity data repository 136. Even though local entity-resolution system 101 and encrypted identity data repository 136 are depicted, online entity-resolution system 102 and identity data repository 152 can perform identical or similar tasks.

At block 301, client computing system 104 determines the data objects to be defragmented. Client computing system 104 can use different methods for data object defragmentation. But regardless of the method used, entity-resolution devices can choose to not respond to random queries, rendering difficult any attempts to obtain large amounts of data from the identity repositories.

Figure 4:
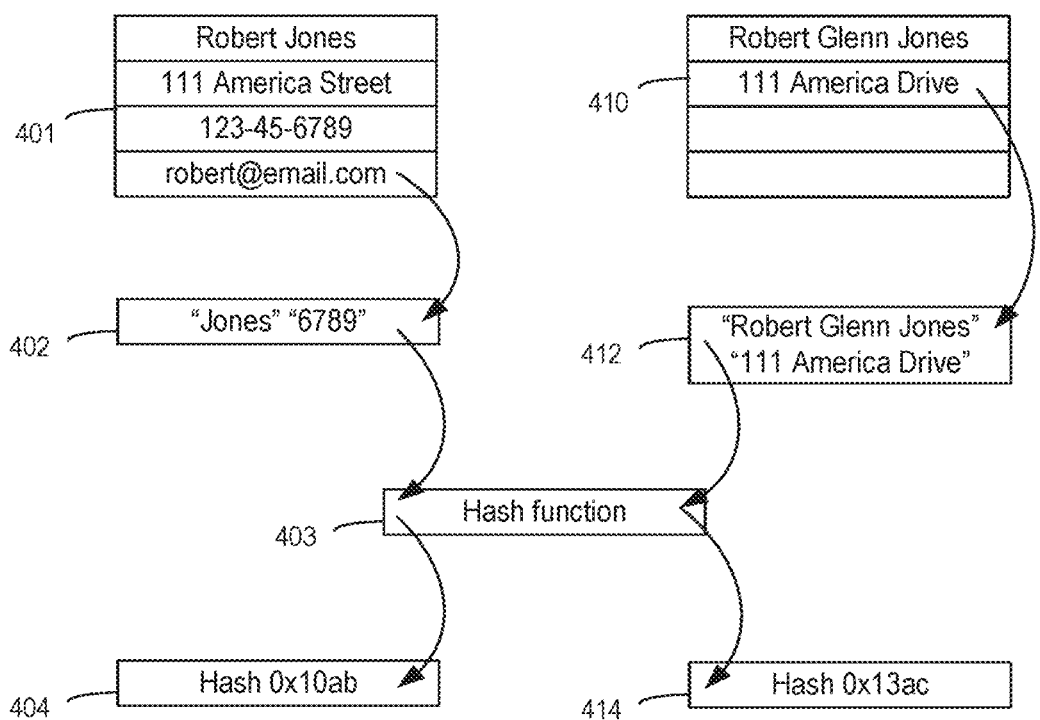
FIG. 4 is a diagram depicting an example of information flow for an entity-resolution computing system according to certain aspects of the present disclosure.

At block 302, client computing system 104 obtains the data objects to be augmented from the client data 134. One such example data object is shown in FIG. 4. FIG. 3 is explained using the data structures depicted in FIG. 4, but other data structures are possible. FIG. 4 is a diagram depicting an example of generating a hashed index from two data objects. For example, FIG. 4 depicts two data objects 401 and 410 which client computing system 104 is unable to determine whether they refer to the same entity. Accordingly, client computing system 104 attempts to defragment data object 401 and data object 410 by using an entity-resolution device.

More specifically, data object 401 contains fields "Robert Jones," "111 America Street," and a numerical value such as a social insurance number 123-45-6789. Data object 401 may be derived from credit information. Data object 410 contains fields "Robert Glenn Jones," and "111 America Drive." Notably, data object 410 lacks a social insurance number. Therefore, client computing system 104 may be unable to verify that data object 401 and data object 410 refer to the same entity, and therefore queries an entity-resolution device.

At block 303, client computing system 104 determines hashed indexes for information within the data objects. As shown, client computing system 104 uses the name, "Robert Jones," and the last four digits of the social insurance number "6789" from data object 401 as a first hashed index.

More specifically, extracted data field 402 depicts the selection of the last name and last four digits of the social insurance number as the basis for the query. Other data fields can be used, such as full name, email address, driver's license number, etc. Client computing system 104 sends the last name and last four digits of the social insurance number depicted in 402 to hash function 403. Hash function 403 creates an index "0x10ab" as depicted in hashed value 404.

Client computing device uses the fields "Robert Glenn Jones" and the address "111 America Drive" as a second hashed index. Client computing system 104 provides the full name and address depicted in 412 to hash function 403. The hash function 403 creates an index "0x13ac" as depicted in hashed value 414.

At block 304, client computing system 104 requests entity identifiers by sending indexes to local entity-resolution system 101. Continuing the example, client computing system 104 sends the first hashed value 404 and the second hashed value 414 to local entity-resolution system 101.

At block 305, the local entity-resolution system 101 determines data objects that correspond to the hashed index by comparing hashed indexed values. Similar to block 202 of process 200, the local entity-resolution system 101 determines whether the hashed value 404 and hashed value 414 refer to the same entity. As discussed above, local entity resolutions system 101 can use different criteria to evaluate which data objects to use.

At block 306, the local entity-resolution system 101 requests data objects by providing the indexes to the encrypted identity data repository 136. The local entity-resolution system 101 requests the data objects that match hashed value 404 and hashed value 414 from the encrypted identity data repository 136.

At block 307, the encrypted identity data repository 136 returns the data objects to the local entity-resolution system 101.

At block 308, the local entity-resolution system 101 determines the entity identifiers that match the data objects.

As discussed above, the matching process can involve, in some aspects, a similarity analysis that is performed using a similarity vector having multiple hashed indexes or hash values.

At block 309, the local entity-resolution system 101 returns the entity identifiers that match the data objects to the client computing system 104. If the first and second hashed indexes refer to a common entity, then the common entity is returned. If the first and second hashed indexes do not match a common entity, different common entity values are returned. If no data objects match a particular hashed value, then the local entity-resolution system 101 can return a default value. Furthermore, as discussed above, some aspects can involve the local entity-resolution system 101 returning scores or other indicators of how closely certain candidate data objects from the encrypted identity data repository 136 match a set of hashed indexes provided by the client computing system 104.

At block 310, the client computing system 104 links data objects that have a common entity identifier. For example, if the entity-resolution device returns one common entity identifier, then the client computing device determines that the two objects refer to the same entity and links or associates the two data objects, thereby defragmenting the data objects.

Figure 5:
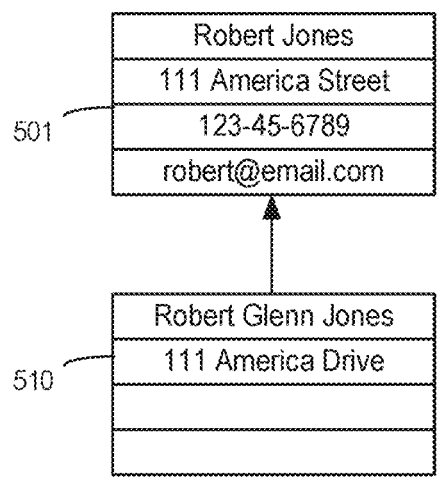
FIG. 5 is a diagram depicting examples of data objects that are defragmented by a client computing device by using the entity-resolution computing device according to certain aspects of the present disclosure.

Continuing the example, FIG. 5 depicts examples of data structures resolved to refer to the same entity. FIG. 5 is a diagram depicting examples of data objects that are defragmented by a client computing device by using the entity-resolution computing device. FIG. 5 depicts data objects 501 and 510. Data objects 501 and 510 are linked because the client computing system 104 has determined that the objects refer to the same entity, for example, by using process 200 or 300. Linking refers to the addition of a reference from one data object to another data object.

Example of Computing Environment for Entity Resolution

Figure 6:
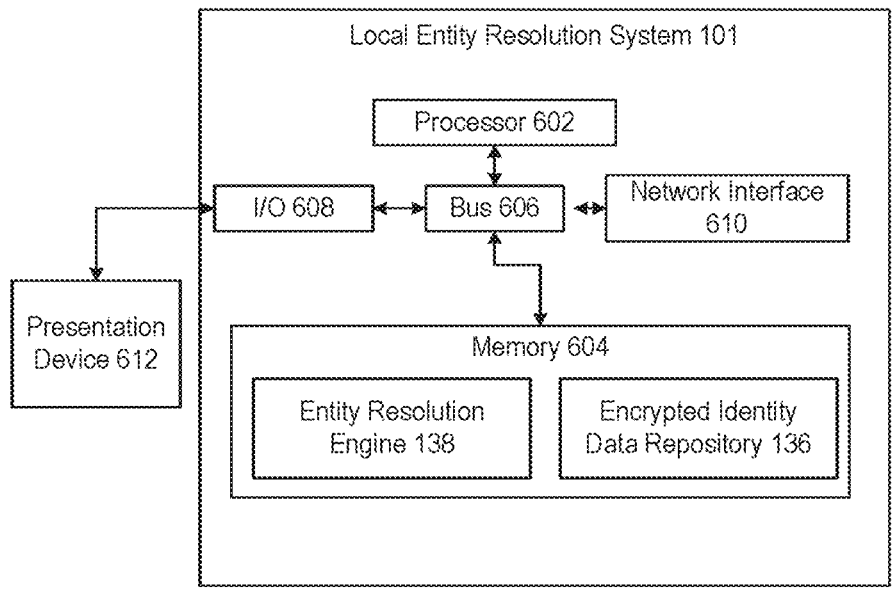
FIG. 6 is a block diagram depicting an example of a computing system suitable for implementing aspects of the techniques and technologies presented herein.
Figure 6:
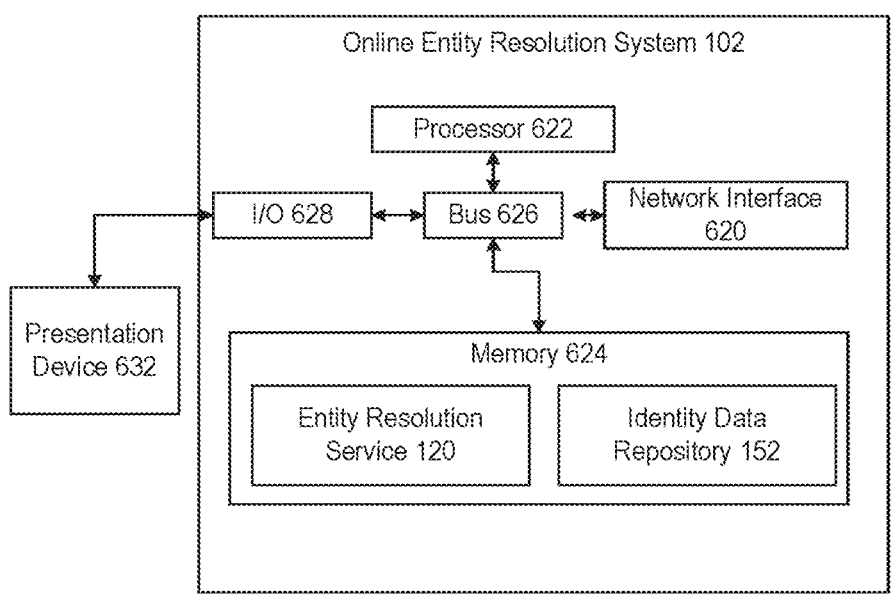

Any suitable computing system or group of computing systems can be used to perform the operations for defragmenting entity data objects described herein. For example, FIG. 6 is a block diagram depicting an example computing systems for local entity-resolution system 101 and online entity-resolution system 102.

Local entity-resolution system 101 can include various devices for performing one or more transformation operations described above with respect to FIGS. 1-5. Local entity-resolution system 101 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The local entity-resolution system 101 may also include a number of external or internal devices such as input or output devices. For example, the local entity-resolution system 101 is shown with an input/output interface 608 that can receive input from input devices or provide output to output devices. A bus 606 can also be included in local entity-resolution system 101. The bus 606 can communicatively couple one or more components of the local entity-resolution system 101.

The local entity-resolution system 101 can execute program code that includes the entity-resolution engine 138. The program code may be resident in any suitable computer-readable medium and may be executed on any suitable processing device. For example, as depicted in FIG. 6, the program code can reside in the memory 604. Executing the entity-resolution engine 138 can configure the processor 602 to perform the operations described herein.

In some aspects, the local entity-resolution system 101 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the local entity-resolution system 101 using one or more data networks described herein. In other aspects, the presentation device 612 can be omitted.

Online entity-resolution system 102 can include various devices for performing one or more transformation operations described above with respect to FIGS. 1-5. Online entity-resolution system 102 can include a processor 622 that is communicatively coupled to a memory 624. The processor 622 executes computer-executable program code stored in the memory 624, accesses information stored in the memory 624, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 622 include a microprocessor, an application-specific integrated circuit, a field-programmable gate array, or any other suitable processing device. The processor 622 can include any number of processing devices, including one. The processor 622 can include or communicate with a memory 624. The memory 624 stores program code that, when executed by the processor 622, causes the processor to perform the operations described in this disclosure.

The memory 624 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The online entity-resolution system 102 may also include a number of external or internal devices such as input or output devices. For example, the online entity-resolution system 102 is shown with an input/output interface 628 that can receive input from input devices or provide output to output devices. A bus 626 can also be included in the online entity-resolution system 102. The bus 626 can communicatively couple one or more components of the online entity-resolution system 102.

The online entity-resolution system 102 can execute program code that includes the entity-resolution service 120. The program code may be resident in any suitable computer-readable medium and may be executed on any suitable processing device. For example, as depicted in FIG. 6, the program code can reside in the memory 624. Executing the entity-resolution service 120 can configure the processor 622 to perform the operations described herein.

In some aspects, the online entity-resolution system 102 can include one or more output devices. One example of an output device is the network interface device 620 depicted in FIG. 6. A network interface device 620 can include any device or group of devices suitable for establishing a wired or wireless data connection to one or more data networks described herein. Non-limiting examples of the network interface device 620 include an Ethernet network adapter, a modem, etc.

Another example of an output device is the presentation device 632 depicted in FIG. 6. A presentation device 632 can include any device or group of devices suitable for providing visual, auditory, or other suitable sensory output. Non-limiting examples of the presentation device 632 include a touchscreen, a monitor, a speaker, a separate mobile computing device, etc. In some aspects, the presentation device 632 can include a remote client-computing device that communicates with the online entity-resolution system 102 using one or more data networks described herein. In other aspects, the presentation device 632 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:

receiving a resolution request from a client computing system, the resolution request comprising a first index generated from a first identity data object and a second index generated from a second identity data object stored in a client identity database accessible by the client computing system;

identifying, from an transformed identity data repository, a first transformed data object that matches the first index and a second transformed data object that matches the second index, the transformed identity data repository comprising transformed data objects and associated common entity identifiers, the transformed data objects preventing sensitive data from being accessed by the client computing system and each common entity identifier associated with two or more transformed data objects that correspond to a common entity;

determining that the first transformed data object and the second transformed data object correspond to a common entity;

in response to determining that the first transformed data object and the second transformed data object correspond to the common entity, retrieving a common entity identifier associated with the first transformed data object and the second transformed data object; and transmitting the common entity identifier to the client computing system, the common entity identifier causing the client computing system to update the client identity database by linking the first identity data object and the second identity data object via the common entity identifier.

2. The method of claim 1, further comprising:

identifying, from the transformed identity data repository, a third transformed data object that matches a third index from the resolution request;

determining that the first transformed data object and the third transformed data object do not correspond to the common entity;

in response to determining that the first transformed data object and the third transformed data object do not correspond to the common entity, retrieving a first common entity identifier associated with the first transformed data object and a second common entity identifier associated with the third transformed data object; and transmitting the first and second common entity identifiers to the client computing system, wherein the first and second common entity identifiers are usable by the client computing system, for linking, in the client identity database, the first identity data object with a third identity data object via the first common entity identifier and the third identity data object with a fourth identity data object via the second common entity identifier.

3. The method of claim 1, wherein identifying the first transformed data object that matches the first index comprises:

generating a first similarity vector based on the first index contained in the resolution request, wherein the first index comprises a plurality of hash values, and wherein the first similarity vector comprises one or more of the plurality of hash values;

identifying a candidate transformed data object from the transformed identity data repository;
generating a second similarity vector based on the candidate transformed data object;
determining an indicator of closeness between the first similarity vector and the second similarity vector; and
identifying the candidate transformed data object as the first transformed data object by determining, based on the indicator of closeness, that the first similarity vector matches the second similarity vector.

4. The method of claim 3, wherein identifying the candidate transformed data object from the transformed identity data repository is performed by matching a subset of the plurality of hash values with corresponding hash values of the candidate transformed data object.

5. The method of claim 3, wherein the transformed data objects comprise at least one of an encrypted data object or a hashed data object.

6. The method of claim 3, further comprising transmitting the indicators of closeness along with the common entity identifier to the client computing system.

7. The method of claim 1, further comprising:
receiving a set of subsequent resolution requests from the client computing system;
identifying, from the set of subsequent resolution requests, a pattern of activity with respect to the transformed identity data repository that is indicative of unauthorized use of the transformed identity data repository; and
removing access to the transformed identity data repository from the client computing system.

8. A system comprising:
one or more storage devices for storing a transformed identity data repository, the transformed identity data repository comprising transformed data objects and associated common entity identifiers, the transformed data objects preventing sensitive data from being accessed by a client computing system and each common entity identifier associated with two or more transformed data objects that correspond to a common entity;
one or more processing devices; and
one or more non-transitory computer-readable media comprising instructions that are executable by the one or more processing devices to cause the system to perform operations comprising:
receiving a resolution request from a client computing system, the resolution request comprising a first index generated from a first identity data object and a second index generated from a second identity data object stored in a client identity database accessible by the client computing system;
identifying, from the transformed identity data repository, a first transformed data object that matches the first index and a second transformed data object that matches the second index;
determining that the first transformed data object and the second transformed data object correspond to the common entity;
in response to determining that the first transformed data object and the second transformed data object correspond to a common entity, retrieving a common entity identifier associated with the first transformed data object and the second transformed data object; and
transmitting the common entity identifier to the client computing system, the common entity identifier causing the client computing system to update the client identity database by linking the first identity data object and the second identity data object via the common entity identifier.

9. The system of claim 8, wherein the operations further comprise:
identifying a third transformed data object that matches a third index from the resolution request;
determining that the first transformed data object and the third transformed data object do not correspond to the common entity;
in response to determining that the first transformed data object and the third transformed data object do not correspond to the common entity, retrieving a first common entity identifier associated with the first transformed data object and a second common entity identifier associated with the third transformed data object; and
transmitting the first and second common entity identifiers to the client computing system, wherein transmitting the first and second common entity identifiers causes the client computing system to link the first identity data object with a third identity data object via the first common entity identifier and to link the third identity data object with a fourth identity data object via the second common entity identifier.

10. The system of claim 8, wherein identifying the first transformed data object that matches the first index comprises:
generating a first similarity vector based on the first index contained in the resolution request, wherein the first index comprises a plurality of hash values, and wherein the first similarity vector comprises one or more of the plurality of hash values;
identifying a candidate transformed data object from the transformed identity data repository;
generating a second similarity vector for the candidate transformed data object;
determining an indicator of closeness between the first similarity vector and the second similarity vector; and
identifying the candidate transformed data object as the first transformed data object by determining, based on the indicator of closeness, that the first similarity vector matches the second similarity vector.

11. The system of claim 10, wherein identifying the candidate transformed data object from the transformed identity data repository is performed by matching a subset of the plurality of hash values with corresponding hash values of the candidate transformed data object.

12. The system of claim 10, wherein the transformed data objects comprise at least one of an encrypted data object or a hashed data object.

13. The system of claim 10, wherein the operations further comprise:
transmitting the indicator of closeness along with the common entity identifier to the client computing system.

14. The system of claim 8, wherein the operations further comprise:
receiving a set of subsequent resolution requests from the client computing system;
identifying, from the set of subsequent resolution requests, a pattern of activity with respect to the transformed identity data repository that is indicative of unauthorized use of the transformed identity data repository; and removing access to the transformed identity data repository from the client computing system.

15. The system of claim 8, wherein the operations further comprise preventing the client computing system from accessing a transformed version of identity information that is (i) in the transformed identity data repository and (ii) absent from the client identity database.

16. A computing system comprising:
one or more first non-transitory computer-readable media for storing a client identity database having (i) a first identity data object with first identity information and (ii) a second identity data object with second identity information,
one or more second non-transitory computer-readable media for storing a transformed identity data repository having a resolved entity dataset, the resolved entity dataset comprising (i) transformed data objects preventing sensitive data from being accessed by a client computing system and having a first transformed version of the first identity information, a second transformed version of the second identity information, and a third transformed version of third identity information that is absent from the client identity database and (ii) a common entity identifier linking the transformed data objects;
the client computing system communicatively coupled to the client identity database and an entity resolution engine and configured for:
generating a first index from the first identity data object and a second index from the second identity data object;
transmitting, to the entity resolution engine, a resolution request comprising the first index and the second index;
receiving, from the entity resolution engine, the common entity identifier, and
updating the client identity database by linking the first identity data object and the second identity data object via the common entity identifier; and
the entity resolution engine communicatively coupled to the transformed identity data repository and configured for servicing the resolution request by performing operations comprising:
matching (i) the first index from the resolution request to the first transformed version of the first identity information and (ii) the second index from the resolution request to the second transformed version of the second identity information, wherein the entity resolution engine is configured to prevent the client computing system from accessing the third identity information,
retrieving the common entity identifier based on the matching, and
transmitting the common entity identifier to the client computing system.

17. The computing system of claim 16, wherein the entity resolution engine is further configured for:
receiving a set of subsequent resolution requests from the client computing system;
identifying, from the set of subsequent resolution requests, a pattern of activity with respect to the transformed identity data repository that is indicative of unauthorized use of the transformed identity data repository; and
removing access to the transformed identity data repository from the client computing system.

18. The computing system of claim 16, wherein
the client identity database further has (i) a fourth identity data object with fourth identity information and (ii) a fifth identity data object with fifth identity information;
the resolved entity dataset further comprises (i) a fourth transformed data object having a fourth transformed version of the fourth identity information, (ii) a fifth transformed data object having a fifth transformed version of the fifth identity information, (iii) a first common entity identifier linking the fourth transformed data object to a sixth transformed data object, and (iv) a second common entity identifier different from the first common entity identifier and linking the fifth transformed data object to a seventh transformed data object;
the client computing system is further configured for:
generating a third index from the fourth identity data object and a fourth index from the fifth identity data object,
transmitting, to the entity resolution engine, a second resolution request comprising the third index and the fourth index,
receiving, from the entity resolution engine, the first common entity identifier and the second common entity identifier, and
updating the client identity database by associating the fourth identity data object with the first common entity identifier and the fifth identity data object with the second common entity identifier; and
the entity resolution engine is configured to perform further operations comprising:
determining that (i) the third index from the second resolution request matches the fourth transformed version of the fourth identity information and (ii) the fourth index from the second resolution request matches the fifth transformed version of the fifth identity information,
retrieving the first common entity identifier and the second common entity identifier based on the determination, and
transmitting the first common entity identifier and the second common entity identifier to the client computing system.

19. The computing system of claim 16, wherein the transformed data objects comprise at least one of an encrypted data object or a hashed data object.

20. The computing system of claim 16, wherein matching the first index to the first transformed version of the first identity information comprises:
generating a first similarity vector based on the first index generated from the first identity data object, wherein the first index comprises a plurality of hash values, and wherein the first similarity vector comprises one or more of the plurality of hash values;
generating a second similarity vector based on the first transformed version of the first identity information;
determining an indicator of closeness between the first similarity vector and the second similarity vector; and
determining that the first identity data object matches the transformed data object based on the indicator of closeness satisfying a rule provided by the client computing system.

* * * * *